United States Patent [19]
Miura et al.

[11] 4,258,820
[45] Mar. 31, 1981

[54] SUB-FRAME SUPPORTING APPARATUS FOR AN AUTOMOBILE

[75] Inventors: Tatsuhiko Miura, Fujimi; Takefumi Toyoshima, Asaka; Kazuo Kikuchi, Sakado; Akio Masaki, Ooi, all of Japan

[73] Assignee: Honda Giken Kogyo Kabushiki Kaisha, Tokyo, Japan

[21] Appl. No.: 70,336

[22] Filed: Aug. 27, 1979

[30] Foreign Application Priority Data

Sep. 4, 1978 [JP] Japan .......................... 53-121295[U]

[51] Int. Cl.³ ............................................. B62D 27/04
[52] U.S. Cl. .................................. 180/295; 248/634; 267/63 R
[58] Field of Search ............... 180/295, 299, 297, 291; 267/63 R, 141; 248/634, 659; 280/788; 296/35.1

[56] References Cited

U.S. PATENT DOCUMENTS

| | | | |
|---|---|---|---|
| 2,908,341 | 10/1959 | Nalunger et al. | 180/295 |
| 2,962,279 | 11/1960 | Wroby | 267/63 R |
| 3,809,427 | 5/1974 | Bennett | 267/63 R |
| 3,881,767 | 5/1975 | Klees | 267/63 R |

FOREIGN PATENT DOCUMENTS

| | | | |
|---|---|---|---|
| 2317856 | 11/1974 | Fed. Rep. of Germany | 267/63 R |
| 2268659 | 11/1975 | France | 267/63 R |

*Primary Examiner*—David M. Mitchell
*Attorney, Agent, or Firm*—Haseltine and Lake

[57] ABSTRACT

A sub-frame supporting device in which a sub-frame adapted to support an engine, wheels and the like is supported from the body of a vehicle through an elastic support member. The supporting device comprises a pair of upper and lower holding plates oppositely disposed, a spacer pipe connecting the holding plates, a fastener for fastening the holding plates to a vehicle body and an elastic support member. A flange of the sub-frame is held between the elastic support member and a damper rib, and gaps are formed adjacent the upper and lower surfaces of the elastic support member. The rigidity of the elastic support member is set so as to be decreased with respect to vertical shearing force and increased with respect to lateral compressive force.

11 Claims, 3 Drawing Figures

SUB-FRAME SUPPORTING APPARATUS FOR AN AUTOMOBILE

BACKGROUND OF THE INVENTION

1. Field of the Invention

The present invention relates to sub-frame supporting apparatus in which a sub-frame which supports the engine, wheels and the like is supported via an elastic support member on the main frame or body of the vehicle.

2. Description of the Prior Art

An elastic support member of the above type is provided to absorb shocks and vibrations produced from the engine and the road surface, and to minimize noise in the passenger compartment. As the rigidity of the elastic support member is decreased, the effect of reducing noise increases, but on the other hand, particularly the lateral position of the wheels becomes unstabilized giving rise to the adverse effect that the maneuvering stability is impaired. In the past, accordingly, in determining the rigidity, that is, the spring constant of the aforesaid elastic support member, the shock and vibration absorbing properties are more or less compelled to be sacrificed because the maneuvering stability cannot be ignored.

SUMMARY OF THE INVENTION

It is an object of the present invention to provide a sub-frame supporting device for automobiles which can provide sufficient shock and vibration absorbing properties, while maintaining the maneuvering stability, and can effectively reduce noise in the passenger compartment.

The above and further objects are satisfied by the provision of support apparatus engageable in a support hole of a sub-frame for supporting the sub-frame on the main frame of the vehicle, said support apparatus comprising upper and lower holding plates, the upper plate being interposed between the main frame and the upper surface of the sub-frame, the lower plate engaging the sub-frame at the lower surface thereof, a spacer pipe secured to the lower plate and extending towards the upper plate, fastener means extending through said pipe for securing the holding plates to the main frame, an elastic support member secured to the outer periphery of said pipe and engaging said sub-frame in the support hole therein and a damper rib extending from the lower surface of the upper holding plate, the sub-frame having an inwardly directed flange at said support hole, said damper rib and elastic support member respectively engaging the inwardly directed flange from above and below, said elastic support member having upper and lower surfaces with gaps formed thereat to take-up relative vertical displacement of said main frame and sub-frame, said upper and lower holding plates forming respective gaps with the upper and lower surfaces of the sub-frame also to take-up said relative vertical displacement.

DETAILED DESCRIPTION

Figure 1:
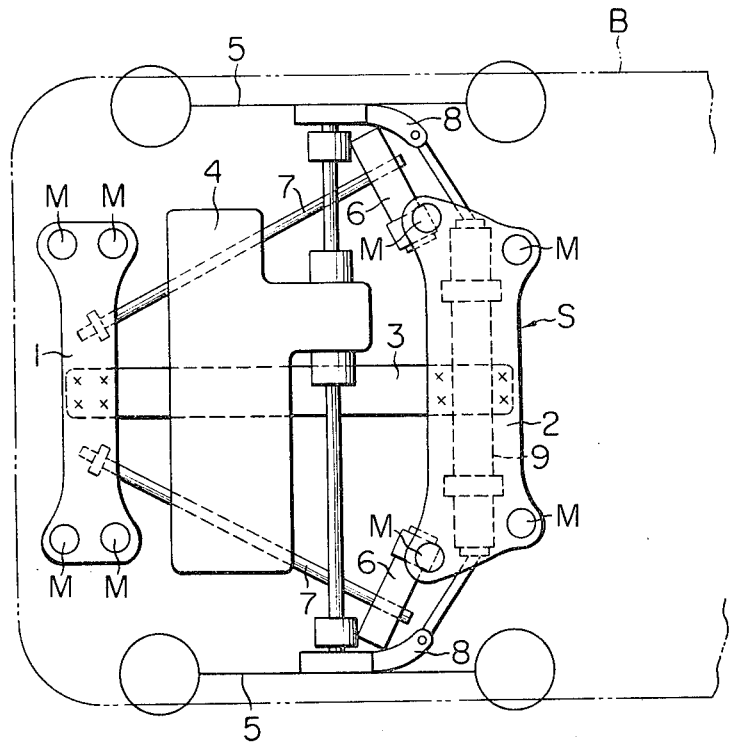
FIG. 1 is a plan view of a front section of an automobile provided with a support device in accordance with the present invention.

One embodiment of the present invention will now be described with reference to the drawings. In FIG. 1 there is seen a front section B of a body, and an entire sub-frame S. The sub-frame S comprises a pair of front and rear cross members 1, 2 connected by a center beam 3 to form a transverse H-shape for the frame. The frame is supported on the body B by the respective cross members 1, 2 through support devices M of the present invention. On the sub-frame S are supported an engine 4, a swing arm 6, supporting wheels 5, a radius rod 7 for controlling the attitude of the arm 6, a steering gear box 9 encasing therein a rack and pinion mechanism to provide interlocking between a knuckle arm 8 of the wheel 5 and a steering wheel (not shown).

Figure 2:
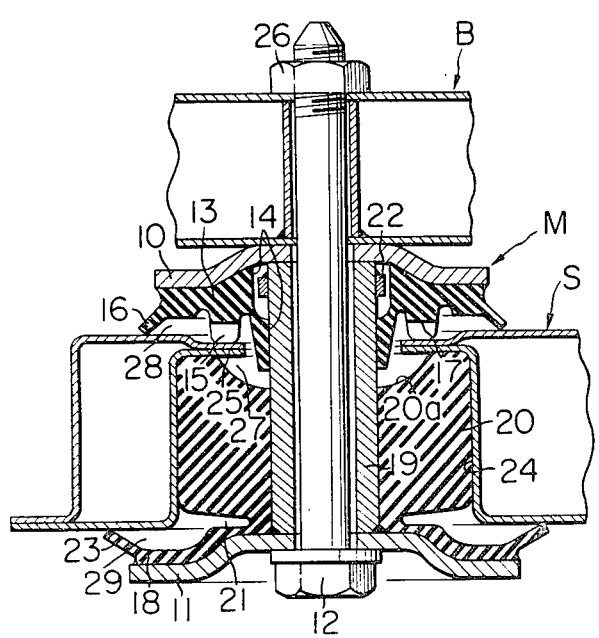
FIG. 2 is a longitudinal sectional view of one embodiment of the support device in accordance with the present invention.
Figure 3:
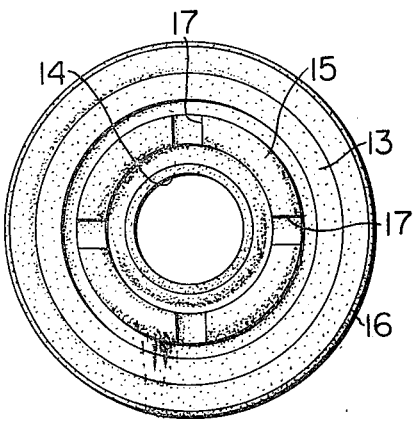
FIG. 3 is a bottom plan view of an upper holding plate of the support device.

The support devices M are all of similar construction, and one of the devices will be described hereinafter in detail referring to FIG. 2.

The support device M comprises a pair of opposed holding plates 10, 11 to hold the sub-frame S therebetween from above and below, and a bolt 12 for connecting the sub-frame S to the body B through the holding plates. The upper holding plate 10 is provided with an elastic stopper plate 13 of rubber or the like adhered to the undersurface thereof by baking. The elastic stopper plate 13 is provided at its center with a stepped hole 14 whose upper portion has a larger diameter. The stopper plate 13 is integrally provided at its undersurface with a damper rib 15 encircling the stepped hole 14 and a dust seal lip 16 encircling the rib 15. The damper rib 15 is formed with notches 17 for effecting its rigidity.

The lower holding plate 11 is provided at its upper surface with an elastic stopper plate 18 of rubber or the like adhered thereto by baking, and a spacer pipe 19 welded to a central portion of the upper surface of the plate 11. The spacer pipe 19 has a cylindrical elastic supporting member 20 of rubber or the like adhered to an outer peripheral surface thereof by baking, the elastic supporting member 20 having an upper surface 20a formed into a conical configuration to facilitate a vertical deformation of the member 20, and a given gap 21 is formed between the member 20 and the lower elastic stopper plate 18. The pipe 19 has an anti-slip ring 22 fixedly mounted on its outer peripheral surface at the upper end thereof, and the lower elastic stopper plate 18 has a dust seal lip 23 integrally extended from the outer periphery thereof.

The sub-frame S is provided with a vertical support hole 24, lower end of which is open, and an annular inwardly directed flange 25 extends from the peripheral edge at the upper end of the support hole.

The support device M may be assembled by placing the upper holding plate 10 on the upper surface of the sub-frame S, inserting from below the elastic support member 20 into the support hole 24 in the sub-frame S and at the same time forcibly inserting the anti-slip ring 22 on the pipe 19 into the upper large diameter hole in the stepped hole 14 so that the lower holding plate 11 is opposite the lower surface of the sub-frame S.

In this stage, if the upwardly directed force applied to the lower holding plate 11 is removed, the elastic support member 20 is prevented from being disengaged by the engagement of the anti-slip ring 22 with the stepped portion of the stepped hole 14.

Next, the bolt 12 is inserted through the lower holding plate 11, the pipe 19, the upper holding plate 10, and the body B in the stated order and a nut 26 is tightened on the upper end of the bolt. Thereby, both holding plates 10, 11 are connected through pipe 19 and fixed on the body B. The elastic support member 20 is subjected to a predetermined initial load to hold the damper rib 15 against flange 25 of the sub-frame S, leaving a gap 27 between the conical upper surface 20a of the elastic support member 20 and the flange 25. Both elastic stopper plates 13, 18 are opposite the upper and lower surfaces of the sub-frame S with given gaps 28, 29 remaining, the dust seal lips 16, 23 engaging the surfaces of the elastic stopper plates 13, 18, respectively.

Since the gaps 27, 21 are formed at the upper and lower sides, respectively, of the elastic support member as mentioned above, when a vertical impact force is applied to the sub-frame S or when vibrations occur, the elastic support member 20 is subjected to a shearing force between the pipe 19 and the sub-frame S so that the support member may be easily deformed to effectively absorb the impact force or vibrations. At the same time the damper rib 15 is also expanded and contracted to absorb the aforementioned impact force or vibrations.

When a vertical displacement of the elastic support member 20 and damper rib 15 reaches a given value, the elastic stopper 13 or 18 resiliently contacts the upper or lower surface of the sub-frame S to prevent excessive deformation of the elastic support member 20 and damper rib 15 and to control vertical vibrations of the sub-frame S.

When a lateral impact force is applied to the sub-frame S or when vibrations occur, the elastic support member 20 is subjected to a compressive force between the pipe 19 and sub-frame S. However, the elastic support member 20 provides high resistance to the aforesaid compressive force since the inner and outer peripheral surfaces of member 20 are in close contact with the pipe 19 and the wall of the support hole 24, and consequently, the resultant compression deformation is minimal so that lateral displacement of the sub-frame S may be restrained.

On the other hand, the dust seal lips 16 and 23 engage the upper and lower surfaces of the sub-frame S at all times during the vibration of the latter to prevent entry of earth and sand, foul water and the like into the support device M, thus preventing wear and damage to the elastic support member 20, damper rib 15 and the like due to invasion of such earth and sand.

In accordance with the present invention, as described above, the rigidity of the cylindrical elastic support member interposed between the support hole 24 in the sub-frame S and the pipe 19 secured to the body B is set so as to be decreased in response to vertical shearing force whereas it is increased in response to the lateral compressive force. With this arrangement, it is possible to sufficiently absorb vertical vibrations of the sub-frame S and to firmly restrain the lateral displacement of the sub-frame S thereby positively preventing lateral random movement of the wheels. Accordingly, it is possible to relieve the noise in the passenger compartment and to retain the maneuvering stability. In addition, a small number of parts will suffice, and the construction is simple.

What is claimed is:

1. Support apparatus for supporting a sub-frame of an automobile on a main frame of the automobile, the sub-frame having a support hole in which the support apparatus is engaged to support the sub-frame on the main frame, said support apparatus comprising upper and lower holding plates, the upper plate being interposed between the main frame and the upper surface of the sub-frame, the lower plate engaging the sub-frame at the lower surface thereof, a spacer pipe secured to the lower plate and extending towards the upper plate, fastener means extending through said pipe for securing the holding plates to the main frame, an elastic support member secured to the outer periphery of said pipe and engaging said sub-frame in the support hole therein, a damper rib extending from the lower surface of the upper holding plate, the sub-frame having an inwardly directed flange at said support hole, said damper rib and elastic support member respectively engaging the inwardly directed flange from above and below, said elastic support member having upper and lower surfaces with gaps formed thereat to take-up relative vertical displacement of said main frame and sub-frame, said upper and lower holding plates forming respective gaps with the upper and lower surfaces of the sub-frame also to take-up said relative vertical displacement.

2. Support apparatus as claimed in claim 1 wherein said lower holding plate has a central hole through which said fastener means extends, said spacer pipe being secured to said lower plate around said central hole.

3. Support apparatus as claimed in claim 1 comprising elastic stopper plates respectively secured to the lower surface of the upper holding plate and the upper surface of the lower holding plate.

4. Support apparatus as claimed in claim 3 wherein said damper rib is integral with the stopper plate secured to the upper holding plate.

5. Support apparatus as claimed in claim 3 wherein said stopper plates include respective dust seal lips engaging the sub-frame at the upper and lower surfaces thereof.

6. Support apparatus as claimed in claim 3 wherein the elastic stopper plate secured to the upper holding plate is provided with a stepped bore, said spacer pipe including an anti-slip ring on the outer periphery thereof, said anti-slip ring being engaged in the larger diameter step of the stepped bore.

7. Support apparatus as claimed in claim 6 wherein said elastic support member has a recessed upper surface forming the gap thereat.

8. Support apparatus as claimed in claim 7 wherein said recessed upper surface is conical.

9. Support apparatus as claimed in claim 7 wherein said elastic stopper plate secured to the upper holding plate includes a flange forming the smaller diameter step of the stepped bore, said flange extending into the support hole of the sub-frame and into the gap at the recessed upper surface of the elastic support member.

10. Support apparatus as claimed in claim 3 wherein said elastic support member and said stopper plate secured to the lower holding plate are integrally formed and provide said gap at the lower surface of the elastic support member.

11. Support apparatus as claimed in claim 1 wherein said damper rib is provided with a notch therein.

* * * * *